(12) United States Patent
Singh

(10) Patent No.: US 9,369,456 B2
(45) Date of Patent: Jun. 14, 2016

(54) SINGLE SIGN-ON IN MULTI-TENANT ENVIRONMENTS

(71) Applicant: INTUIT INC., Mountain View, CA (US)

(72) Inventor: Servesh Pratap Singh, Bangalore (IN)

(73) Assignee: INTUIT INC., Mountain View, CA (US)

( * ) Notice: Subject to any disclaimer, the term of this patent is extended or adjusted under 35 U.S.C. 154(b) by 8 days.

(21) Appl. No.: 13/624,732

(22) Filed: Sep. 21, 2012

(65) Prior Publication Data

US 2014/0090037 A1    Mar. 27, 2014

(51) Int. Cl.
| | |
|---|---|
| *H04L 29/06* | (2006.01) |
| *G06F 21/33* | (2013.01) |
| *G06F 21/41* | (2013.01) |
| G06F 21/62 | (2013.01) |
| G06F 21/31 | (2013.01) |

(52) U.S. Cl.
CPC .......... *H04L 63/0815* (2013.01); *G06F 21/335* (2013.01); *G06F 21/41* (2013.01); *G06F 21/31* (2013.01); *G06F 21/6218* (2013.01); *H04L 63/08* (2013.01); *H04L 63/205* (2013.01)

(58) Field of Classification Search
CPC ... H04L 63/0815; H04L 63/205; H04L 63/08; G06F 21/335; G06F 21/6218; G06F 21/31; G06F 21/41

USPC .................................................. 726/2, 5, 7–9
See application file for complete search history.

(56) References Cited

U.S. PATENT DOCUMENTS

| | | | |
|---|---|---|---|
| 7,496,954 B1 | 2/2009 | Himawan et al. | |
| 8,453,224 B2 | 5/2013 | Mutt | |
| 8,566,917 B2 | 10/2013 | Vangpat et al. | |
| 2003/0065789 A1* | 4/2003 | Meghashyam | G06Q 30/02 709/228 |
| 2009/0117883 A1* | 5/2009 | Coffing et al. | 455/414.1 |
| 2010/0198730 A1* | 8/2010 | Ahmed | G06F 17/30528 705/50 |

FOREIGN PATENT DOCUMENTS

| | | |
|---|---|---|
| JP | 2011128994 | 6/2011 |
| JP | 2012168795 | 9/2012 |

* cited by examiner

*Primary Examiner* — Kambiz Zand
*Assistant Examiner* — Ayoub Alata
(74) *Attorney, Agent, or Firm* — Patterson + Sheridan LLP

(57) ABSTRACT

The disclosed embodiments provide a system that authenticates a user. During operation, the system identifies a first tenant associated with a first request for a first resource from the user and obtains an authentication policy for the first tenant. Next, the system uses an authentication mechanism associated with the authentication policy to authenticate the user. Upon authenticating the user, the system provides a first security token for enabling access to the first resource by the user.

25 Claims, 4 Drawing Sheets

SINGLE SIGN-ON IN MULTI-TENANT ENVIRONMENTS

BACKGROUND

Related Art

The disclosed embodiments relate to identity management. More specifically, the disclosed embodiments relate to techniques for performing single sign-on in multi-tenant environments.

Single sign-on (SSO) may allow a user to authenticate once before gaining access to multiple applications, services, and/or offerings that are related but independent. For example, an SSO system may allow the user to sign into multiple web applications, websites, and/or web services using a single login and password, thus reducing overhead, confusion, and/or security risks associated with re-authenticating the user with each new application.

However, SSO is typically unavailable for hosted, multi-tenant environments, in which applications and/or resources are shared among multiple organizations and/or customers within a cloud computing system. Instead, a user may be required to authenticate before accessing each individual tenant, even if the authentication mechanisms used to authenticate the user are also shared by the tenants. Consequently, the deployment, maintenance, and use of software offerings in multi-tenant environments may be improved by techniques for providing SSO to users of the software offerings.

SUMMARY

The disclosed embodiments provide a system that authenticates a user. During operation, the system identifies a first tenant associated with a first request for a first resource from the user and obtains an authentication policy for the first tenant. Next, the system uses an authentication mechanism associated with the authentication policy to authenticate the user. Upon authenticating the user, the system provides a first security token for enabling access to the first resource by the user.

In some embodiments, the system also builds a security context using the first security token and provides the first resource to the user.

In some embodiments, the system also identifies a second tenant associated with a second request for a second resource from the user. Next, the system detects a previous authentication of the user with the first tenant. Finally, the system provides a second security token for enabling access to the second resource by the user without requiring additional authentication of the user.

In some embodiments, the previous authentication of the user with the first tenant is detected using a cookie from a browser of the user.

In some embodiments, each of the first and second tenants is associated with at least one of a software offering, a group of users, a set of resources, a group of tools, and a group of portals.

In some embodiments, the authentication policy comprises at least one of a policy name, the authentication mechanism, and location information for authentication credentials associated with the authentication mechanism.

In some embodiments, using the authentication mechanism associated with the authentication policy to authenticate the user involves:

(i) using the authentication mechanism to obtain one or more user-provided authentication credentials from the user;
(ii) using the location information to obtain the authentication credentials; and
(iii) comparing the user-provided authentication credentials with the authentication credentials.

In some embodiments, the location information comprises at least one of a repository, a configuration of the repository, and a mechanism for accessing the repository.

In some embodiments, the first tenant is identified using a tenant identifier associated with the first request.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
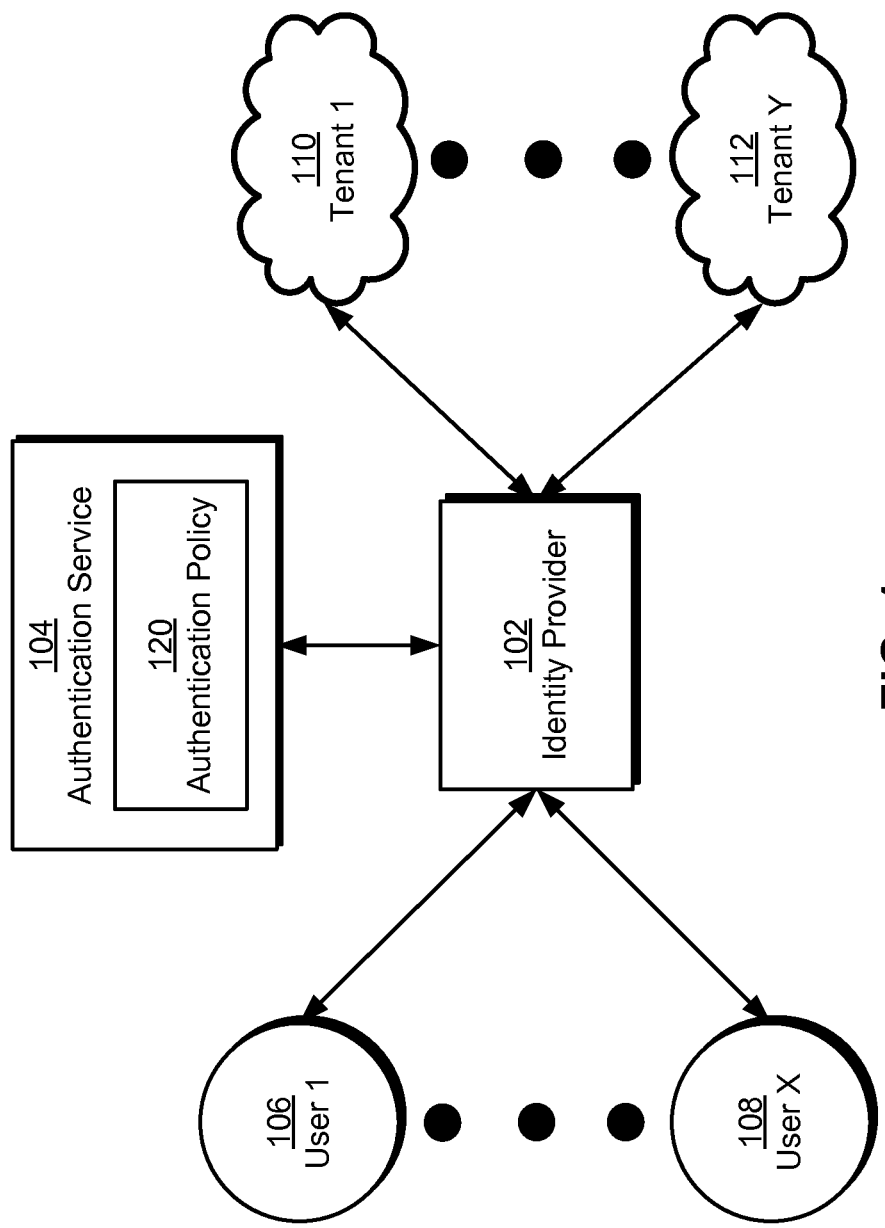
FIG. 1 shows a schematic of a system in accordance with the disclosed embodiments.

The disclosed embodiments provide a method and system for authenticating a user. More specifically, the disclosed embodiments provide a method and system for performing single sign-on (SSO) in a multi-tenant environment. As shown in FIG. 1, a set of tenants (e.g., tenant 1 110, tenant y 112) may provide applications, services, and/or data hosted on a cloud computing system. For example, each tenant may be associated with a different customer, organization, business unit, and/or other type of entity. In addition, the tenant may be responsible for providing, maintaining, and/or deploying the corresponding applications, services, and/or data for use by a set of users (e.g., user 1 106, user x 108). For example, the tenants may be associated with overlapping and/or non-overlapping subsets of users of the multi-tenant environment.

In one or more embodiments, each tenant is also associated with a software offering, a set of resources, a group of tools, and/or a group of portals. For example, the tenants may provide cloud-based software offerings that are implemented using client-server architectures, such as web applications, distributed applications, and/or web services. As a result, each software offering may be deployed and executed on a set of resources (e.g., servers, databases, storage devices, network links, etc.), and one or more portals and/or tools provided by the software offering may be accessed by a group of users (e.g., user 1 106, user x 108) from other machines using a locally installed executable, a command-line interface, and/or a web browser and network connection.

Prior to accessing the software offerings, the users may be required to authenticate themselves with an identity provider 102 and/or authentication service 104 associated with the tenants and/or cloud computing system. For example, a user may provide a username and password, biometric identifier, personal identification number (PIN), certificate, and/or other authentication credentials to identity provider 102 and/or authentication service 104 prior to retrieving financial account information for the user from one or more financial-management and/or tax-preparation applications hosted on the cloud computing system.

To further facilitate use of the software offerings, identity provider 102 and/or authentication service 104 may provide SSO capabilities to the tenants. In turn, each user may only be required to authenticate once per user session with identity provider 102 and/or authentication service 104 to access all resources (e.g., data, services, applications, etc.) associated with the user on the cloud computing system, regardless of the distribution of the resources among the tenants. As discussed in further detail below, such SSO may be enabled by the use of a centralized authentication policy 120 that allows identity provider 102 and/or authentication service 104 to identify the authentication mechanism associated with a given tenant and authenticate the user using the authentication mechanism. After the user is authenticated, identity provider 102 and/or authentication service 104 may provide one or more security tokens that grant access to resources on the tenant and/or other tenants with which the user has user accounts, thus allowing the user to avoid re-authenticating while the user is "logged in" with identity provider 102 and/or authentication service 104.

Figure 2:
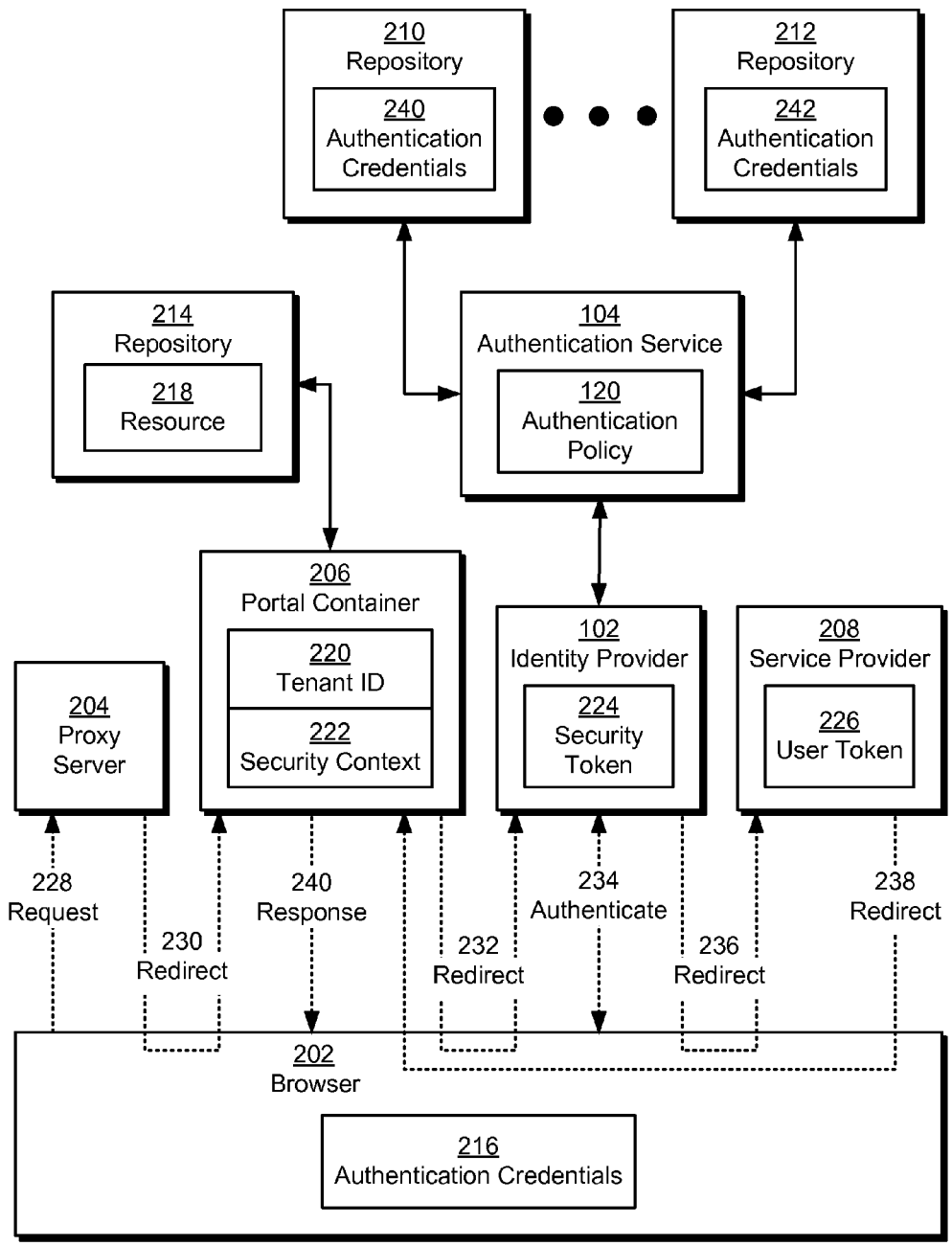
FIG. 2 shows a set of mechanisms for providing single sign-on in a multi-tenant environment in accordance with the disclosed embodiments.

FIG. 2 shows a set of mechanisms for providing SSO in a multi-tenant environment in accordance with the disclosed embodiments. As mentioned above, the SSO may be implemented by identity provider 102 and authentication service 104. More specifically, identity provider 102 and authentication service 104 may allow a user to initially provide authentication credentials 216 for accessing a software offering hosted in the multi-tenant environment and subsequently switch from the software offering to other software offerings in the multi-tenant environment to which the user has access without re-authenticating.

To interact with the software offering, the user may provide a request 228 for a resource 218 associated with the software offering from a browser 202 (e.g., a web browser). For example, request 228 may be a HyperText Transfer Protocol (HTTP) request for a webpage containing data associated with a user account of the user with the software offering. Alternatively, the user may request resource 218 through a command-line interface, locally installed executable, and/or other mechanism for communicating with a cloud computing system.

Request 228 may be received by a proxy server 204 associated with the cloud computing system. Proxy server 204 may act as an intermediary between the user and/or other external users and the resources internal to the network and/or cloud computing system. For example, proxy server 204 may reside in a demilitarized zone (DMZ) of a network and/or cloud computing system hosting the multi-tenant environment. To increase the reliability, efficiency, throughput, and/or utilization of the cloud computing system, proxy server 204 may also provide load balancing that distributes requests (e.g., request 228) from the users across multiple servers in the cloud computing system.

Next, proxy server 204 may perform a redirect 230 of request 228 to a portal container 206 hosting the software offering and/or other software offerings in the multi-tenant environment. Portal container 206 may provide a filter that checks for authentication of the user before providing resource 218 to the user. For example, portal container 206 may check for a user token 226 associated with a user session of the user to determine if the user has been previously authenticated by the cloud computing system.

If the user has not been previously authenticated (e.g., user token 226 is not present), portal container 206 may initiate authentication of the user by identifying the tenant associated with request 228. For example, portal container 206 may obtain a tenant identifier (ID) 220 for the tenant from a domain name and/or other attribute in request 228 and include tenant ID 220 in a second redirect 232 of request 228 to identity provider 102. Alternatively, tenant ID 220 may be obtained by identity provider 102 and/or authentication service 104 during subsequent authentication of the user, as described below.

Once request 228 reaches identity provider 102, identity provider 102 and/or authentication service 104 may authenticate 234 the user based on authentication policy 120. First, identity provider 102 and/or authentication service 104 may use tenant ID 220 to retrieve authentication policy 120 for the tenant. For example, authentication service 104 may match tenant ID 220 to a set of Extensible Markup Language (XML) elements in authentication policy 120 listed under tenant ID 220. If tenant ID 220 is not provided by portal container 206, identity provider 102 and/or authentication service 104 may obtain tenant ID 220 from a set of authentication credentials 216 from the user. For example, the user may specify a username of "[login]@[tenant].com" to identity provider 102, allowing identity provider 102 and/or authentication service 104 to obtain tenant ID 220 from the second part of the username.

Authentication policy 120 may include a number of elements, such as a policy name that contains tenant ID 220 and/or other information associated with the tenant. Authentication policy 120 may also specify the authentication mechanism for the tenant, such as a username and password, a biometric identifier, a PIN, and/or a certificate.

Authentication policy 120 may additionally include location information for authentication credentials (e.g., authentication credentials 240-242) associated with the authentication mechanism. The location information may specify a repository 210-212 containing the authentication credentials, including a name and/or network address of the repository. The location information may also describe a configuration of the repository, such as the type of database, directory (e.g., Lightweight Directory Access Protocol (LDAP) directory), and/or authentication infrastructure used to store the authentication credentials. Finally, the location information may include a mechanism for accessing the repository, such as information for connecting to the database, directory, and/or authentication infrastructure.

To authenticate 234 the user, authentication service 104 may use the authentication mechanism specified in authentication policy 120 to obtain one or more user-provided authentication credentials 216 from the user. For example, authentication service 104 may generate a login page that requests a username and password, biometric identifier, PIN, and/or certificate from the user. The login page may additionally show a logo, brand, and/or layout associated with the tenant to establish a continuous user experience with the tenant. In other words, the login page may be formatted to give the user the impression that the login page is served from portal container 206 instead of authentication service 104.

Authentication service 104 may also use the location information in authentication policy 120 to obtain the corresponding authentication credentials (e.g., authentication credentials 240-242) from the repository (e.g., repositories 210-212). For example, authentication service 104 may use the location information to connect to a database and perform a query for a database entry matching one or more of the user-provided authentication credentials 216.

Authentication service 104 may then compare the user-provided authentication credentials 216 with the authentication credentials from the repository. If the two sets of authentication credentials match, the user is authenticated. If the authentication credentials do not match, the user may be prompted to try again until the user runs out of a pre-specified number of authentication attempts.

After the user is authenticated, identity provider 102 may provide a security token 224 for the user in a redirect 236 of request 228 to a service provider 208 for the tenant. For example, identity provider 102 may transmit a Security Assertion Markup Language (SAML) assertion containing an authentication statement for the user to service provider 208. Service provider 208 may validate security token 224 and include a user token 226 for the user in a redirect 238 to portal container 206. Portal container 206 may then use an asserter to build a security context 222 using user token 226 and enable access to resource 218 by the user. For example, portal container 206 may use a Java Authentication and Authorization Service (JAAS) login module to build a Java (Java™ is a registered trademark of Oracle America, Inc.) Platform, Enterprise Edition (JEE) security context for a JEE application and/or software offering. Portal container 206 may then use the JEE application to create a webpage containing the requested resource 218 from a repository 214 and transmit the webpage to browser 202.

As mentioned above, the system of FIG. 2 may allow the user to access other software offerings and/or tenants without re-authenticating. To bypass such re-authentication, identity provider 102 and/or authentication service 104 may allow previous authentication of the user to be detected. For example, identity provider 102 and/or authentication service 104 may store a cookie representing previous authentication of the user in browser 202. If the user subsequently requests a second resource from a second tenant, the request may be redirected to identity provider 102 and/or authentication service 104, and identity provider 102 and/or authentication service 104 may obtain the cookie from browser 202. Identity provider 102 may then provide a second security token for enabling access to the second resource, which may be used by service provider 208, portal container 206, and/or another component of FIG. 2 to build a second security context and provide the second resource to the user. The user may thus continue requesting resources from multiple tenants without re-authenticating until the cookie and/or the user session for the user expires.

Consequently, identity provider 102 and/or authentication service 104 may provide SSO for all tenants in the multi-tenant environment. In turn, identity provider 102 and/or authentication service 104 may streamline the user experience with the multi-tenant environment while reducing maintenance, infrastructure costs, and/or overhead associated with authenticating users separately for each tenant. Identity provider 102 and/or authentication service 104 may also use an authentication policy 120 that decouples the authentication mechanisms from the tenants, enabling configuration and customization of the authentication mechanisms for individual tenants instead of requiring all tenants to use the same authentication mechanism. In other words, the system of FIG. 2 may be easier to scale, extend, manage, configure, customize, and/or use than conventional authentication solutions for multi-tenant environments.

Those skilled in the art will appreciate that the system of FIG. 2 may be implemented in a variety of ways. First, identity provider 102, authentication service 104, proxy server 204, portal container 206, service provider 208, and/or other components of FIG. 2 may be provided by the same hardware and/or software component, or the components may execute independently from one another. For example, the functionality of identity provider 102 and authentication service 104 may be implemented by a single server and/or component, or identity provider 102 and authentication service 104 may be implemented by multiple distributed components and/or servers. Along the same lines, the functionality of service provider 208, portal container 206, and/or proxy server 204 may be combined and/or rearranged to accommodate different multi-tenant architectures. In turn, redirects 230-232 and 236-238 among the components may be added, removed, and/or reordered to enable the SSO capabilities of the system with the different multi-tenant architectures.

Second, components and/or resources other than identity provider 102 and authentication service 104 may be distributed among tenants in the multi-tenant environment in different ways. For example, a single service provider 208 may be used by all tenants in the multi-tenant environment, or a different service provider may be associated with each tenant. Similarly, authentication mechanisms for the tenants may be provided by a separate repository (e.g., repositories 210-212) for each tenant or by a single database, LDAP directory (e.g., with multiple base distinguished names (DNs), each representing a different tenant), authentication infrastructure, and/or other type of repository for all tenants.

Figure 3:
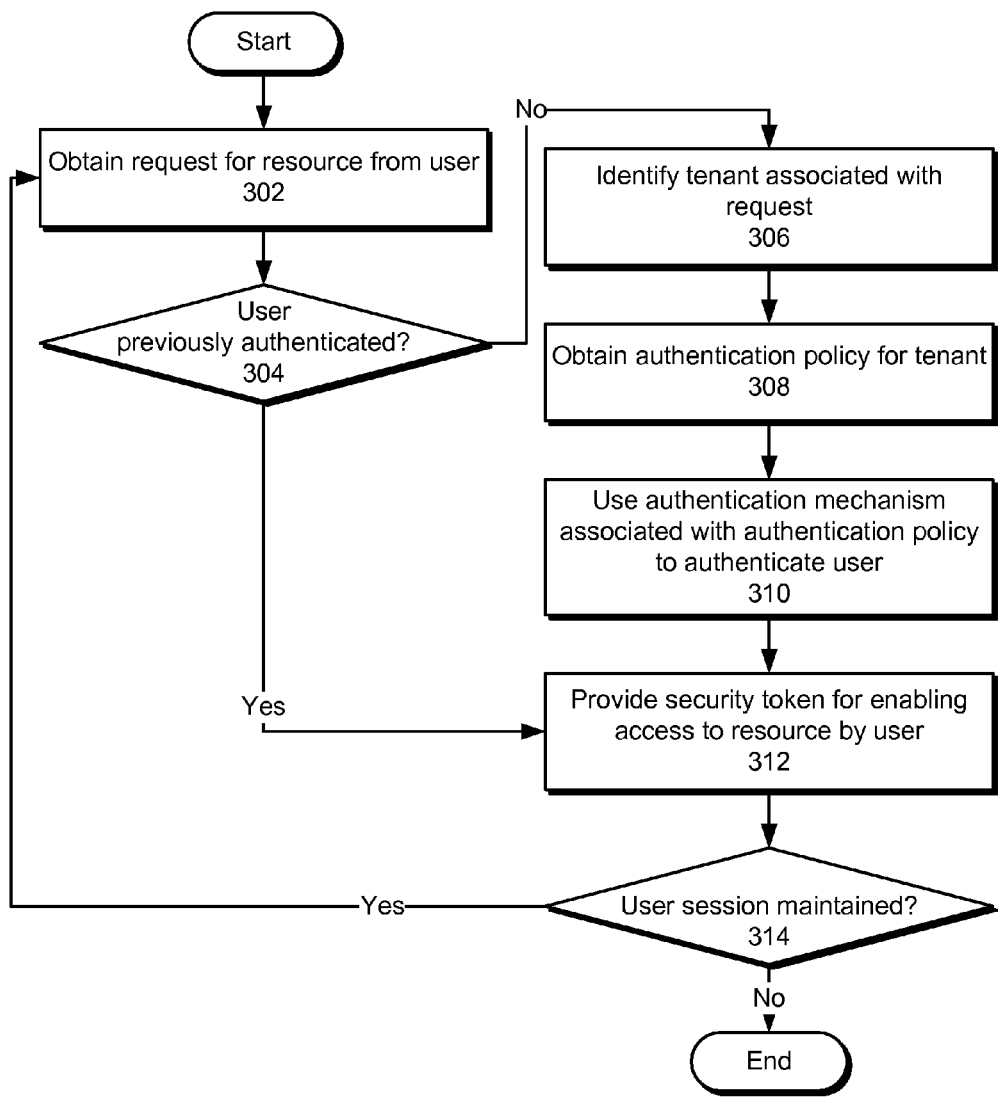
FIG. 3 shows a flowchart illustrating the process of authenticating a user in accordance with the disclosed embodiments.

FIG. 3 shows a flowchart illustrating the process of authenticating a user in accordance with the disclosed embodiments. In one or more embodiments, one or more of the steps may be omitted, repeated, and/or performed in a different order.

Accordingly, the specific arrangement of steps shown in FIG. 3 should not be construed as limiting the scope of the technique.

Initially, a request for a resource is obtained from a user (operation 302). The request may be associated with a software offering deployed within a multi-tenant environment. For example, the user may request a webpage containing user data for the user from a software offering associated with a tenant in the multi-tenant environment. The request may be processed based on a previous authentication of the user (operation 304) within the same user session. The previous authentication may be detected using a cookie from a browser of the user and/or another mechanism for establishing the user session for the user. If the user has previously been authenticated, a security token is provided for enabling access to the resource by the user (operation 312). For example, the security token may be used to create a security context that enables access to the resource by the user.

If the user has not previously been authenticated, a tenant associated with the request is identified (operation 306). The tenant may be associated with a software offering, a group of users, a set of resources, a group of tools, and/or a group of portals. The tenant may be identified using a tenant ID associated with the request. For example, the tenant ID may be obtained from the domain name associated with the requested resource and/or a username provided by the user.

Next, an authentication policy for the tenant is obtained (operation 308). The authentication policy may include a policy name, the authentication mechanism, and/or location information for authentication credentials associated with the authentication mechanism. The location information may include a repository containing the authentication credentials, a configuration of the repository, and/or a mechanism for accessing the repository.

The authentication mechanism associated with the authentication policy is then used to authenticate the user (operation 310). For example, the authentication mechanism may be used to obtain one or more user-provided authentication credentials from the user (e.g., by requesting the user-provided authentication credentials through a webpage), and the location information is used to obtain the authentication credentials (e.g., by performing a query with the repository containing the authentication credentials). The user-provided authentication credentials may then be compared with the authentication credentials from the repository. If the two sets of credentials match, the user is authenticated. If the credentials do not match, the user may be given a number of attempts to authenticate successfully before the user is prevented from further authentication attempts for a pre-specified period (e.g., five minutes, one hour, one day, etc.).

After the user is authenticated, a security token is provided for enabling access to the resource by the user (operation 312). As mentioned above, the security token may then be used to create a security context, and the resource may be provided to the user.

The user session may be maintained (operation 314) during use of the multi-tenant environment by the user. If the user session is maintained, subsequent requests for resources from the user are processed by detecting the previous authentication of the user and providing security tokens for enabling access to the resources by the user (operations 302-312). Such bypassing of additional authentication of the user while the user session is maintained may enable SSO for the user with the multi-tenant environment.

Figure 4:
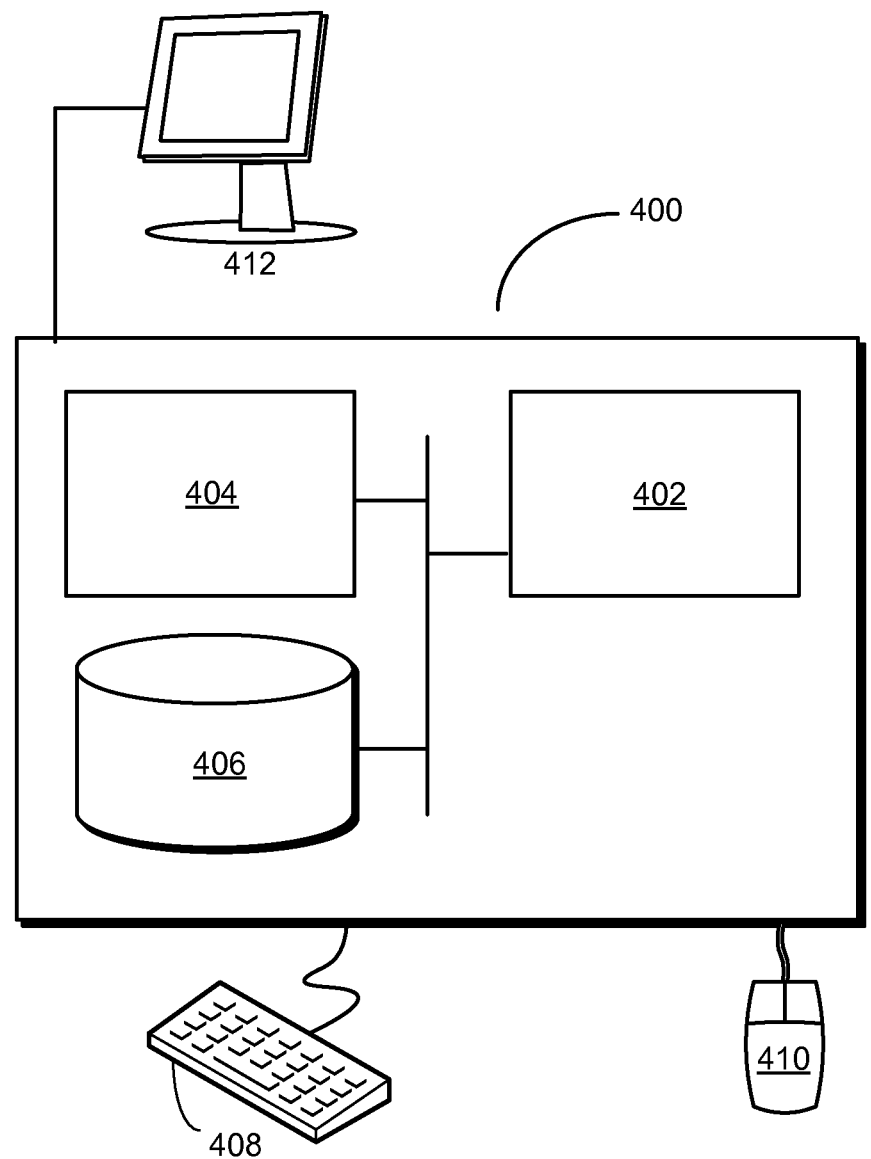
FIG. 4 shows a computer system in accordance with the disclosed embodiments.

FIG. 4 shows a computer system 400. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In particular, computer system 400 may provide a system for authenticating a user. The system may include an identity provider and an authentication service. The identity provider and/or authentication service may identify a first tenant associated with a first request for a first resource from the user and obtain an authentication policy for the first tenant. Next, the identity provider and/or authentication service may use an authentication mechanism associated with the authentication policy to authenticate the user. After authenticating the user, the identity provider and/or authentication service may provide a first security token for enabling access to the first resource by the user. The system may also include a portal container that builds a security context using the first security token and provides the first resource to the user.

The identity provider and/or authentication service may also identify a second tenant associated with a second request for a second resource from the user and detect a previous authentication of the user with the first tenant. The identity provider and/or authentication service may then provide a second security token for enabling access to the second resource by the user without requiring additional authentication of the user. Finally, the portal container may build a second security context using the second security token and provide the second resource to the user.

In addition, one or more components of computer system 400 may be remotely located and connected to the other components over a network. Portions of the present embodiments (e.g., identity provider, authentication service, portal container, etc.) may also be located on different nodes of a distributed system that implements the embodiments. For example, the present embodiments may be implemented using a cloud computing system that provides SSO to users of a multi-tenant environment.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for authenticating a user in a hosted, multi-tenant computing environment, comprising:
   receiving a request for access to a first resource from a user, wherein the user has an account with a first plurality of tenants in the multi-tenant computing environment;
   identifying a first tenant associated with the first request, wherein the first tenant is in the first plurality of tenants;
   obtaining an authentication policy of the first tenant;

using an authentication mechanism associated with the authentication policy of the first tenant to authenticate the user;

upon authenticating the user, providing a first security token for enabling access to the first resource by the user, wherein the first tenant provides access to the first resource;

storing a representation of authenticating the user with respect to the first tenant;

receiving a second request from the user for a second resource, wherein a second tenant provides access to the second resource, wherein the second tenant belongs to the first plurality of tenants, wherein the second tenant is different from the first tenant, and wherein the second tenant has an authentication policy that is different from the authentication policy of the first tenant;

subsequent to receiving the second request from the user for the second resource from the second tenant, automatically detecting, by computer, that the user has been previously authenticated with respect to the first tenant by accessing the stored representation of the authentication of the user with respect to the first tenant;

using the detected previous authentication of the user with respect to the first tenant to authenticate the user with respect to the authentication policy of the second tenant; and upon authenticating the user with respect to the authentication policy of the second tenant, providing, by the computer, a second security token for enabling access to the second resource by the user without requiring additional authentication credentials from the user.

2. The computer-implemented method of claim 1, wherein the authentication policy comprises at least one of a policy name, the authentication mechanism, and location information for authentication credentials associated with the authentication mechanism.

3. The computer-implemented method of claim 2, wherein using the authentication mechanism associated with the authentication policy to authenticate the user involves:
using the authentication mechanism to obtain one or more user-provided authentication credentials from the user;
using the location information to obtain the authentication credentials; and
comparing the user-provided authentication credentials with the authentication credentials.

4. The computer-implemented method of claim 2, wherein the location information comprises at least one of a repository, a configuration of the repository, and a mechanism for accessing the repository.

5. The computer-implemented method of claim 1, wherein the first tenant is identified using a tenant identifier associated with the first request.

6. The computer-implemented method of claim 1, further comprising:
building a first security context using the first security token to enable access to the first resource; and
storing a representation of the authentication of the user.

7. The computer-implemented method of claim 6, wherein detecting the previous authentication of the user with the first tenant involves obtaining the stored representation of the previous authentication, and wherein the stored representation comprises a cookie in a browser of the user.

8. The computer-implemented method of claim 7, wherein each of the first and second tenants is associated with at least one of a software offering, a group of users, a set of resources, a group of tools, and a group of portals.

9. A system for authenticating a user in a hosted, multi-tenant computing environment, comprising:
an identity provider and an authentication service,
wherein the identity provider and the authentication service are configured to:
receive a request for access to a first resource from a user, wherein the user has an account with a first plurality of tenants in the multi-tenant computing environment;
identify a first tenant associated with the first request, wherein the first tenant is in the first plurality of tenants; and
obtain an authentication policy of the first tenant;
use an authentication mechanism associated with the authentication policy of the first tenant to authenticate the user;
upon authenticating the user, provide a first security token for enabling access to the first resource by the user, wherein the first tenant provides access to the first resource;
store a representation of authenticating the user with respect to the first tenant;
receive a second request from the user for a second resource, wherein a second tenant provides access to the second resource, wherein the second tenant belongs to the first plurality of tenants, wherein the second tenant is different from the first tenant, and wherein the second tenant has an authentication policy that is different from the authentication policy of the first tenant;
subsequent to receiving the second request from the user for the second resource from the second tenant, automatically detect that the user has been previously authenticated with respect to the first tenant by accessing the stored representation of the authentication of the user with respect to the first tenant;
use the detected previous authentication of the user with respect to the first tenant to authenticate the user with respect to the authentication policy of the second tenant; and
upon authenticating the user with respect to the authentication policy of the second tenant, provide a second security token for enabling access to the second resource by the user without requiring additional authentication credentials from the user.

10. The system of claim 9, further comprising:
a portal container configured to:
build a security context using the first security token; and
provide the first resource to the user.

11. The system of claim 10, further comprising:
storing a representation of the authentication of the user.

12. The system of claim 11, wherein detecting the previous authentication of the user with the first tenant involves obtaining the stored representation of the previous authentication, and wherein the stored representation comprises a cookie in a browser of the user.

13. The system of claim 9, wherein each of the first and second tenants is associated with at least one of a software offering, a group of users, a set of resources, a group of tools, and a group of portals.

14. The system of claim 9, wherein the authentication policy comprises at least one of a policy name, the authentication mechanism, and location information for authentication credentials associated with the authentication mechanism.

15. The system of claim 14, wherein using the authentication mechanism associated with the authentication policy to authenticate the user involves:

using the authentication mechanism to obtain one or more user-provided authentication credentials from the user;

using the location information to obtain the authentication credentials; and comparing the user-provided authentication credentials with the authentication credentials.

16. The system of claim 14, wherein the location information comprises at least one of a repository, a configuration of the repository, and a mechanism for accessing the repository.

17. The system of claim 9, wherein the first tenant is identified using a tenant identifier associated with the first request.

18. A non-transitory computer-readable storage medium storing instructions that when executed by a computer cause the computer to perform a method for authenticating a user in a hosted, multi-tenant computing environment, the method comprising:

receiving a request for access to a first resource from a user, wherein the user has an account with a first plurality of tenants in the multi-tenant computing environment;

identifying a first tenant associated with the first request, wherein the first tenant is in the first plurality of tenants;

obtaining an authentication policy for the first tenant;

using an authentication mechanism associated with the authentication policy of the first tenant to authenticate the user;

upon authenticating the user, providing a first security token for enabling access to the first resource by the user, wherein the first tenant provides access to the first resource;

storing a representation of authenticating the user with respect to the first tenant;

receiving a second request from the user for a second resource, wherein a second tenant provides access to the second resource, wherein the second tenant belongs to the first plurality of tenants, wherein the second tenant is different from the first tenant, and wherein the second tenant has an authentication policy that is different from the authentication policy of the first tenant;

subsequent to receiving the second request from the user for the second resource from the second tenant, automatically detecting, by computer, that the user has been previously authenticated with respect to the first tenant by accessing the stored representation of the authentication of the user with respect to the first tenant;

using the detected previous authentication of the user with respect to the first tenant to authenticate the user with respect to the authentication policy of the second tenant; and upon authenticating the user with respect to the authentication policy of the second tenant, providing, by the computer, a second security token for enabling access to the second resource by the user without requiring additional authentication credentials from the user.

19. The computer-readable storage medium of claim 18, wherein each of the first and second tenants is associated with at least one of a software offering, a group of users, a set of resources, a group of tools, and a group of portals.

20. The computer-readable storage medium of claim 18, wherein the authentication policy comprises at least one of a policy name, the authentication mechanism, and location information for authentication credentials associated with the authentication mechanism.

21. The computer-readable storage medium of claim 20, wherein using the authentication mechanism associated with the authentication policy to authenticate the user involves:

using the authentication mechanism to obtain one or more user-provided authentication credentials from the user;

using the location information to obtain the authentication credentials; and comparing the user-provided authentication credentials with the authentication credentials.

22. The computer-readable storage medium of claim 20, wherein the location information comprises at least one of a repository, a configuration of the repository, and a mechanism for accessing the repository.

23. The computer-readable storage medium of claim 18, wherein the first tenant is identified using a tenant identifier associated with the first request.

24. The computer-readable storage medium of claim 18, further comprising:

building a first security context using the user token and the first security token to enable access to the first resource; and storing a representation of the authentication of the user.

25. The computer-readable storage medium of claim 24, wherein detecting the previous authentication of the user with the first tenant involves obtaining the stored representation of the previous authentication, and wherein the stored representation comprises a cookie in a browser of the user.

* * * * *